United States Patent
Park

(10) Patent No.: US 10,479,366 B2
(45) Date of Patent: Nov. 19, 2019

(54) GEAR SHIFT CONTROL METHOD OF DCT VEHICLE

(71) Applicant: HYUNDAI AUTRON CO., LTD., Seongnam-si (KR)

(72) Inventor: Seong-Jin Park, Suwon-si (KR)

(73) Assignee: Hyundai Autron Co., Ltd., Seoul (KR)

( * ) Notice: Subject to any disclaimer, the term of this patent is extended or adjusted under 35 U.S.C. 154(b) by 66 days.

(21) Appl. No.: 15/806,586

(22) Filed: Nov. 8, 2017

(65) Prior Publication Data

US 2018/0126996 A1    May 10, 2018

(30) Foreign Application Priority Data

Nov. 9, 2016    (KR) .................... 10-2016-0148800

(51) Int. Cl.
| | |
|---|---|
| *B60W 30/19* | (2012.01) |
| *B60W 10/02* | (2006.01) |
| *B60W 10/113* | (2012.01) |

(52) U.S. Cl.
CPC ............ *B60W 30/19* (2013.01); *B60W 10/02* (2013.01); *B60W 10/113* (2013.01); *B60W 2510/0275* (2013.01); *B60W 2510/0283* (2013.01); *B60W 2510/0638* (2013.01); *B60W 2510/1015* (2013.01); *B60W 2540/103* (2013.01); *B60W 2710/027* (2013.01); *B60W 2710/1005* (2013.01); *B60W 2710/1083* (2013.01)

(58) Field of Classification Search
None
See application file for complete search history.

(56) References Cited

FOREIGN PATENT DOCUMENTS

| DE | 10 2014 103 672 A1 | 9/2015 |
|---|---|---|
| DE | 10 2014 118 319 A1 | 11/2015 |
| DE | 10 2015 114 572 A1 | 3/2016 |
| JP | 2013083309 A | 5/2013 |
| JP | 2015-224777 A | 12/2015 |
| JP | 6912327 B2 | 4/2016 |
| KR | 1020140038222 A | 3/2014 |
| KR | 1020150125756 A | 11/2015 |
| KR | 1020160064359 A | 6/2016 |

*Primary Examiner* — Timothy Hannon
(74) *Attorney, Agent, or Firm* — Baker & Hostetler LLP; Hyunho Park

(57) ABSTRACT

Disclosed is a gear shift control method of a Dual Clutch Transmission (DCT) vehicle. The gear shift control method includes a gear shift start determination step of determining whether a kick down shift, a biaxial shift determination step of determining, when the kick down shift is started, whether the gear shift is a biaxial shift; a clutch torque control step of uniformly decreasing torque of a release-side clutch and uniformly increasing torque of a connection-side clutch to synchronize revolutions per minute of a target gear input shaft with increasing revolutions per minute of an engine, a clutch synchronization determination step of determining whether the revolutions per minute of the target gear input shaft is synchronized with the revolutions per minute of the engine by the clutch torque control, and a gear shift performing step of performing gear shift control for engaging the target gear.

11 Claims, 5 Drawing Sheets

GEAR SHIFT CONTROL METHOD OF DCT VEHICLE

CROSS REFERENCE TO RELATED APPLICATION

The present application claims the benefit of Korean Patent Application No. 10-2016-0148800 filed in the Korean Intellectual Property Office on Nov. 9, 2016, the entire contents of which are incorporated herein by reference.

BACKGROUND OF THE INVENTION

Field of the Invention

The present invention relates to a gear shift control method of a vehicle, particularly, to a gear shift control method of a Dual Clutch Transmission (DCT) vehicle, which can promptly reflect acceleration intention of a driver in the DCT vehicle.

Background of the Related Art

A Dual Clutch Transmission (DCT) is configured such that two input shafts provided in two clutches to intermittently receive power and two output shafts respectively corresponding to the two input shafts alternately form gears according to a series of gear ratios, together with a separate shift mechanism. That is, power is transferred to one of the two input shafts, and the two input shafts and the two output shafts configure odd-numbered gears and even-numbered gears, respectively.

The most outstanding feature of the DCT is a fast gear shift without interruption of power. For example, if gears are sequentially shifted from a first gear level to a second gear level, i.e., a next gear level, a clutch connected to an input shaft currently combined with a first gear is released, and a clutch connected to another input shaft combined with a second gear is engaged immediately, and thus a fast gear shift without interruption of power can be implemented.

For the fast gear shift without interruption of power, which is the most outstanding feature of a DCT transmission, it is important to engage a target gear as soon as possible when gears are shifted. Particularly, in the case of a downshift reflecting acceleration intention of a driver (hereinafter, referred to as 'kick down shift'), accurate gear shift control is required in the early stage of gear shift to promptly reflect the acceleration intention of the driver and overcome a feeling of discontinuity caused by the difference of gear ratio between gears when the gears are shifted.

To this end, a 'release clutch engine control' is performed in the early stage of the gear shift. Here, the 'release clutch engine control' is a control of increasing or decreasing torque of a clutch so that the engine speed, i.e., revolutions per minute (RPM)', becomes equal to the synchronized speed of a target gear, and the 'release clutch' is a clutch for transferring power of the engine to a currently engaged gear, which is a release-side clutch whose connection is released when the gears are shifted.

If a kick down shift is made in the DCT, the power connection state between the engine and the current gear is released by decreasing torque of the release-side clutch, and contrarily, the engine and a target gear are connected by increasing torque of an apply clutch (hereinafter, referred to as a 'connection-side clutch'), so that power of the engine is transferred to the target gear through the connection-side clutch and an input shaft connected to the connection-side clutch.

In the case of a generally known automatic transmission, torque transfer may be smoothly accomplished by applying the apply torque to the connection-side clutch as soon as the 'release clutch engine control' is completed. Contrarily, in the case of the DCT, a target gear should be necessarily engaged in order to apply the apply torque to the connection-side clutch.

If a target gear is not engaged although the 'release clutch engine control' is completed, the 'release clutch engine control' should be continued until a target gear is engaged, and the driver may feel that the torque is discontinued or the acceleration intention is not reflected. That is, the 'release clutch engine control' should be harmonized well with target gear engagement to implement the fast gear shift without a feeling of discontinuity.

For the fast engagement of a target gear, a method of controlling a hydraulic control solenoid valve by applying overcurrent may be considered. However, in this case, it is worried that severe noises and impacts to the vehicle may occur due to the supply of overcurrent, and since transfer of torque through the clutch is not accomplished smoothly due to the shaking of the input shaft because of the impacts when the impacts occur, gear shift quality is lowered greatly.

Particularly, in the case of a kick down shift in which the difference between the synchronized speed of a target gear and the actual revolving speed of a target gear input shaft is big, the speed of boosting the engine is faster although the gear is engaged as soon as possible, and thus unnecessary 'release clutch engine control' or 'engine torque reduction control' should be performed, and as a result, the driver may feel that the torque is not transferred properly regardless of the acceleration intention.

Furthermore, as the slip time between the release-side clutch and the engine is extended due to the 'release clutch engine control', it may be critical to the lifespan of the clutch due to abrasion or thermal deformation of the clutch. Therefore, in the prior art, revolutions per minute of the engine should be increased slowly as shown in FIG. 1, considering even the time of inserting a target gear when the kick down shift is made, and thus shift delay occurs, and a satisfying acceleration performance is not obtained.

SUMMARY OF THE INVENTION

Therefore, the present invention has been made in view of the above problems, and it is an object of the present invention to provide a gear shift control method of a DCT vehicle, which can minimize a feeling of discontinuity and abrasion of a clutch according to shift delay.

To accomplish the above object, according to one aspect of the present invention, in a gear shift control method of a vehicle mounted with a Dual Clutch Transmission (DCT) including two input shafts provided in two clutches to intermittently receive power and two output shafts respectively corresponding to the two input shafts, which alternately form gears according to a series of gear ratios, together with a separate shift mechanism, there is provided a gear shift control method of a DCT vehicle, in which if a difference of gear level between a target gear and a current gear is as much as an odd-numbered gear level larger than one level when a kick down shift of performing a gear shift to a lower gear is made as an acceleration pedal is handled according to an acceleration intention of a driver, torque of a release-side clutch for transferring engine power to the current gear is uniformly decreased, and torque of a connection-side clutch is uniformly increased to synchronize revolutions per minute of a target gear input shaft with increasing revolutions per minute of an engine, and a gear shift control for engaging the target gear is performed at a time point of synchronizing the revolutions per minute of the target gear input shaft with the revolutions per minute of the engine.

Further preferably, the gear shift control method of a DCT vehicle according to an embodiment of the present invention may include: a gear shift start determination step (step S100) of determining whether a kick down shift, which performs a gear shift to a lower gear as an acceleration pedal is handled according to an acceleration intention of a driver, is started; a biaxial shift determination step (step S200) of determining, when the kick down shift is started, whether the gear shift is a biaxial shift, in which a difference of gear level between a target gear and a current gear is as much as an odd-numbered gear level larger than one level; a clutch torque control step (step S300) of uniformly decreasing torque of a release-side clutch and uniformly increasing torque of a connection-side clutch to synchronize revolutions per minute of a target gear input shaft with increasing revolutions per minute of an engine, if a current gear state of the vehicle determined at the biaxial shift determination step is the biaxial shift; a clutch synchronization determination step (step S400) of determining whether the revolutions per minute of the target gear input shaft is synchronized with the revolutions per minute of the engine by the clutch torque control; and a gear shift performing step (step S500) of performing gear shift control for engaging the target gear, when the revolutions per minute of the target gear input shaft is synchronized with the revolutions per minute of the engine.

Here, at the gear shift start determination step, whether the kick down shift is started may be determined from part or all of information on a displacement of the acceleration pedal and a difference between the current revolutions per minute of the engine and target revolutions per minute set according to handling of the acceleration pedal.

In addition, at the biaxial shift determination step, if it is a down shift in which a difference C between the revolutions per minute of the target gear input shaft and the target revolutions per minute of the engine at a time point of starting the kick down shift is larger than a preset reference value (Th1 rpm), the down shift may be determined as a biaxial shift in which the difference is as much as an odd-numbered gear level larger than one level.

In addition, in a process of synchronizing the revolutions per minute of the target gear input shaft with the revolutions per minute of the engine through the clutch torque control, the torque of the connection-side clutch may be jumped to a synchronization start torque (a NM) at a time point of starting the kick down shift and increased until a synchronization determination time point f1 at a certain torque gradient (b NM/sec).

At this point, a value of the synchronization start torque (a NM) and a value of the torque gradient (b NM/sec) may be values selected from values recorded in advance in correspondence to a difference C between the revolutions per minute of the target gear input shaft and the target revolutions per minute of the engine at the time point of starting the kick down shift.

In addition, the clutch synchronization determination step (step S400) may include the steps of: determining whether the revolutions per minute of the target gear input shaft and the revolutions per minute of the engine arrive at a synchronization determination time point f1 (step S410); and determining whether the revolutions per minute of the target gear input shaft and the revolutions per minute of the engine synchronized with each other arrive at a synchronization completion time point at which the revolutions per minute of the target gear input shaft and the revolutions per minute of the engine become equal to a target revolutions per minute of the engine (step S420).

At this point, if it is determined that the revolutions per minute of the target gear input shaft and the revolutions per minute of the engine arrive at the synchronization determination time point f1, it is preferable to maintain the torque at the time point of arriving at the synchronization determination time point f1 as the torque of the connection-side clutch until the synchronization completion time point.

In addition, if it is determined that the revolutions per minute of the target gear input shaft and the revolutions per minute of the engine arrive at the synchronization completion time point, it is preferable to perform engagement of the target gear after the torque of the connection-side clutch is reduced to a clutch torque transfer start point TP.

In addition, at the gear shift performing step, engagement of the target gear may be implemented by adjusting supply voltage of a hydraulic control solenoid valve involved in the engagement of the target gear among a plurality of hydraulic control solenoid valves.

Preferably, engagement of the target gear may be implemented by switching the fluid passage of the hydraulic control solenoid valve so that fluid pressure may be provided to a clutch or a brake which enables and disables engagement of the target gear, among a plurality of clutches or brakes.

DESCRIPTION OF SYMBOLS

Figure 1:
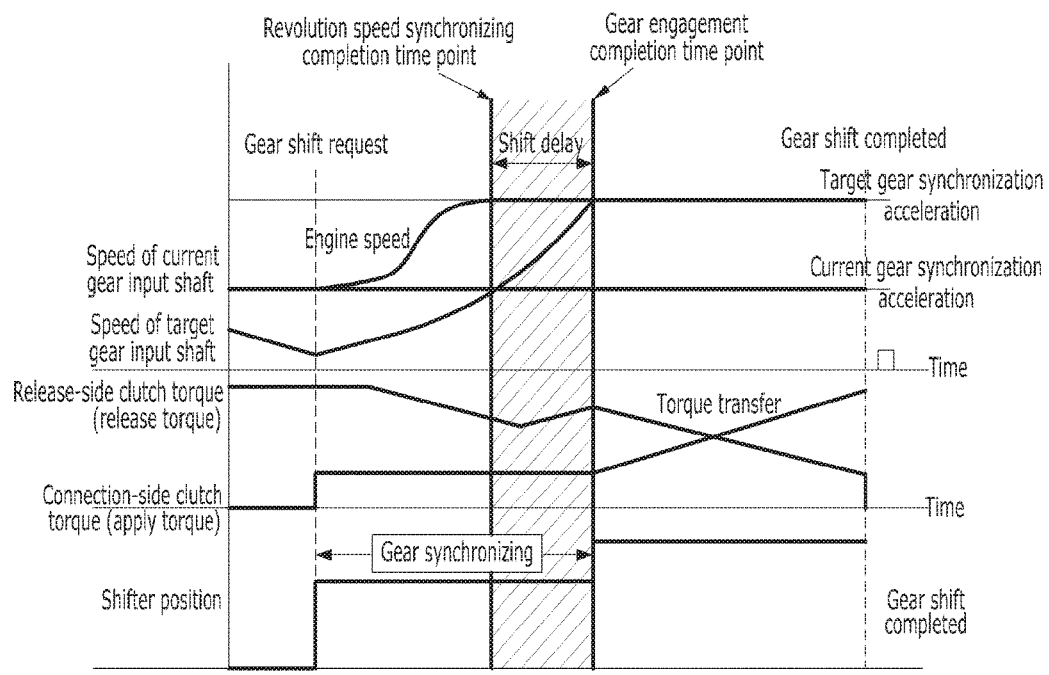
FIG. 1 is a graph illustrating a gear shift control method of a conventional DCT vehicle.

S100: Gear shift start determination step
S200: Biaxial shift determination step
S300: Clutch torque control step
S400: Clutch synchronization determination step
S500: Gear shift performing step

DETAILED DESCRIPTION OF THE PREFERRED EMBODIMENT

The preferred embodiments of the invention will be hereafter described in detail, with reference to the accompanying drawings.

The terms used in the specification are used to describe only specific embodiments and are not intended to limit the present disclosure. Singular forms are intended to include plural forms unless the context clearly indicates otherwise. It will be further understood that the terms "include", "comprise" and "have" used in this specification specify the presence of stated features, numerals, steps, operations, components, parts or a combination thereof, but do not preclude the presence or addition of one or more other features, numerals, steps, operations, components, parts or a combination thereof.

The terms such as "first" and "second" can be used in describing various elements, but the above elements shall not be restricted by the above terms. The above terms are used only to distinguish one element from the others.

In addition, the terms such as " . . . section", " . . . unit", " . . . module" and the like specified in the specification indicate a unit of processing at least one function or operation, and this can be implemented in hardware or software or implemented as a combination of hardware and software.

In describing with reference to the accompanying drawings, any identical or corresponding elements will be given same reference numerals, and description of the identical or corresponding elements will not be repeated. In describing the present invention, when it is determined that the detailed description of the known art related to the present invention may obscure the gist of the present invention, the detailed description thereof will be omitted.

First, the configuration of a DCT related to the present invention will be roughly described with reference to FIG. 2, and a Dual Clutch Transmission (DCT) applying a 7-speed automatic shift mechanism will be described as an example.

Figure 2:
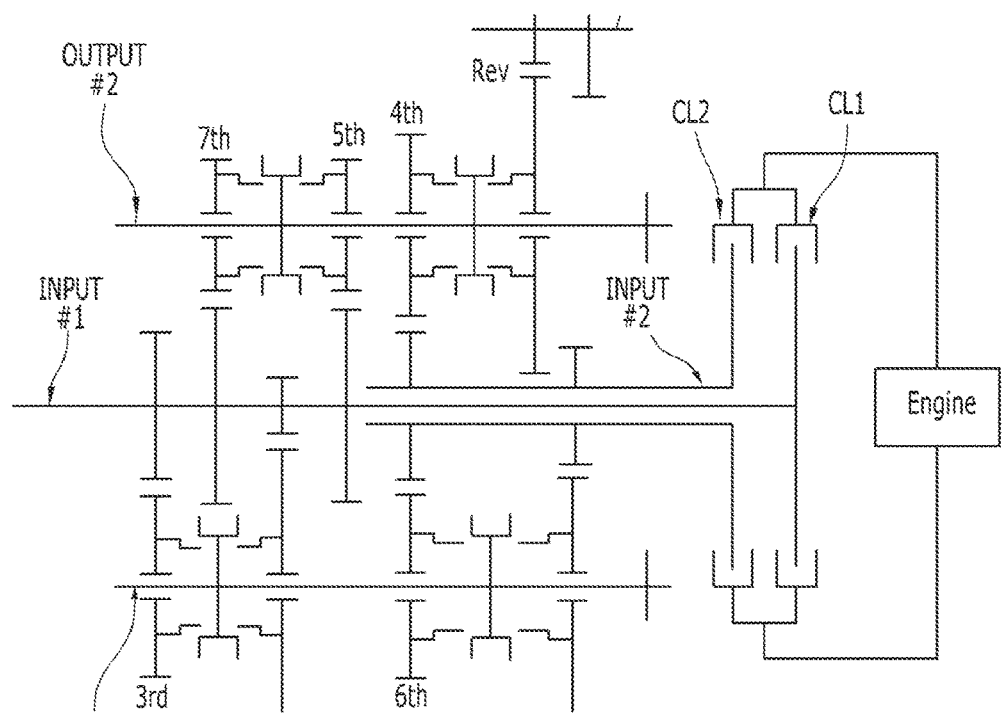
FIG. 2 is a view schematically showing the configuration of a DCT related to the present invention.

FIG. 2 is a view schematically showing the configuration of a DCT related to the present invention.

Referring to FIG. 2, a Dual Clutch Transmission (DCT) includes a first input shaft INPUT#1 provided to intermittently receive power from a power source, e.g., an engine, and a second input shaft INPUT#2 installed to form a concentric shaft together with the first input shaft INPUT#1 and provided to intermittently receive power from the power source.

The first input shaft INPUT#1 and the second input shaft INPUT#2 are configured to alternately form gears according to a series of gear ratios, together with a separate shift mechanism. For example, the first input shaft INPUT#1 is configured to form odd-numbered (first, third, fifth and seventh) gears together with a separate shift mechanism, and the second input shaft INPUT#2 is configured to form even-numbered (second, fourth and sixth) gears together with a separate shift mechanism.

The first input shaft INPUT#1 and the second input shaft INPUT#2 are respectively connected to the power source through a first clutch CL1 and a second clutch CL2 to intermittently receive power from the power source, i.e., the engine, and one of the first input shaft INPUT#1 and the second input shaft INPUT#2 is configured to form an R gear together.

The separate shift mechanism is disposed in parallel to the first input shaft INPUT#1 and the second input shaft INPUT#2 and includes a first output shaft OUTPUT#1 and a second output shaft OUTPUT#2 formed to configure a plurality of gears by a constantly engaged synchro-mesh type shift mechanism together with the first input shaft INPUT#1 and the second input shaft INPUT#2.

That is, a constantly engaged shift gear is provided between the first input shaft INPUT#1 and the second input shaft INPUT#2 and between the first output shaft OUTPUT#1 and the second output shaft OUTPUT#2, and as the state of a shift gear connected to the first output shaft OUTPUT#1 or the second output shaft OUTPUT#2 is changed by a conventional synchronizer mechanism, shift of each gear is implemented.

Odd-numbered gears are configured as the first input shaft INPUT#1 forms first and third gears together with the first output shaft OUTPUT#1 and fifth and seventh gears together with the second output shaft OUTPUT#2, and even-numbered gears are configured as the second input shaft INPUT#2 forms second and sixth gears together with the first output shaft OUTPUT#1 and fourth and R gears together with the second output shaft OUTPUT#2.

That is, the first input shaft INPUT#1 and the second input shaft INPUT#2 are respectively configured to alternately form a series of gears configured of the first to seventh gears, and at this point, the second input shaft INPUT#2 is configured to form the R gear together with the second output shaft OUTPUT#2 and a separate reverse idler shaft RS.

Hereinafter, gear shift control of a Dual Clutch Transmission (DCT) configured as described above will be described.

Since clutch torque is controlled to simultaneously increase revolutions per minute of the target gear input shaft and revolutions per minute of the engine and engagement of a target gear is attempted at the time point of synchronizing the revolutions per minute of the target gear input shaft with the revolutions per minute of the engine when a kick down shift of performing a gear shift to a lower gear is made as the acceleration pedal is handled according to acceleration intention of a driver, gear shift control of a DCT vehicle according to the present invention may reduce shift delay to the maximum.

Preferably, in the case of a biaxial shift among the kick down shift, in which the difference of gear level between a target gear and the current gear is as much as an odd-numbered gear level larger than one level, a fast gear shift without a feeling of torque discontinuity is implemented by attempting engagement of the target gear while revolutions per minute of the target gear input shaft is synchronized with revolutions per minute of the engine by uniformly decreasing torque of the release-side clutch to which the current gear is connected and uniformly increasing torque of the connection-side clutch connected to the target gear.

This will be described in further detail with reference to the figures.

Figure 3:
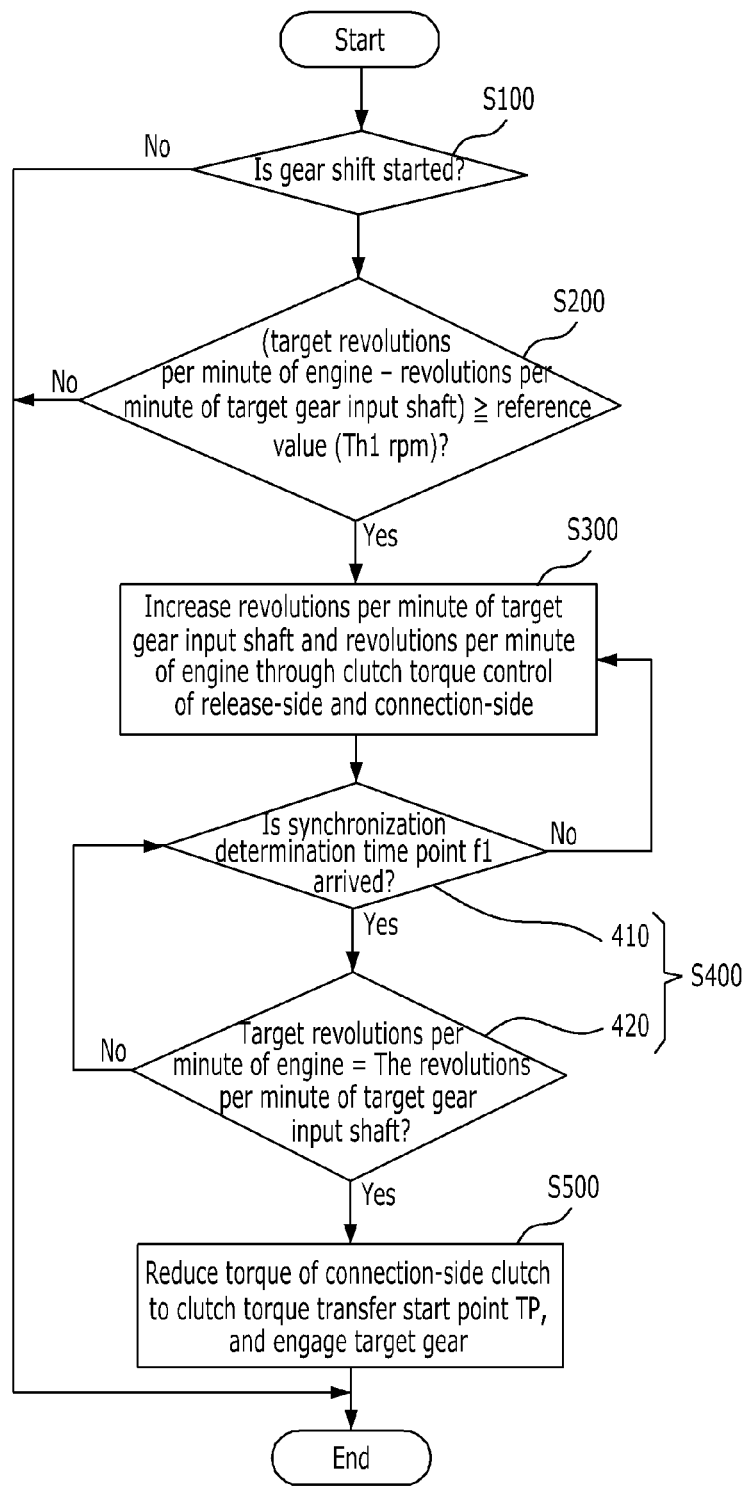
FIG. 3 is a flowchart illustrating a gear shift control method according to an embodiment of the present invention, which is applied for gear shift control of a DCT vehicle.
Figure 4:
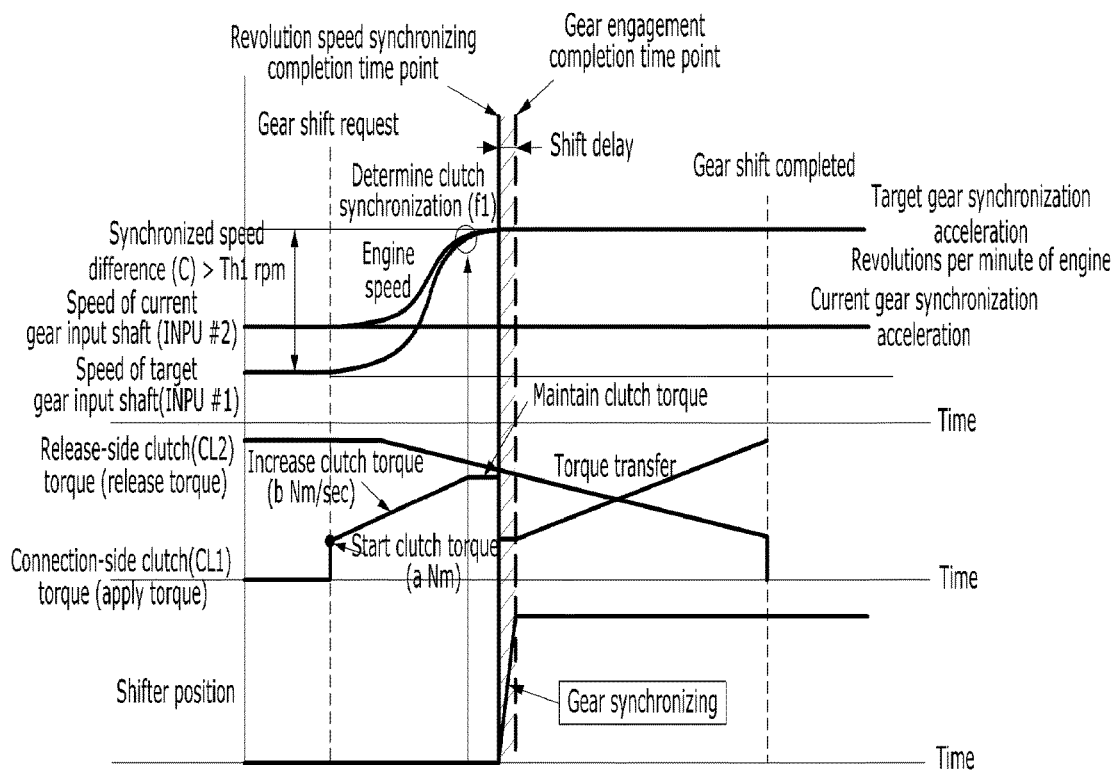
FIG. 4 is a graph illustrating a gear shift control method of a DCT vehicle according to the present invention.

FIG. 3 is a flowchart illustrating a gear shift control method according to an embodiment of the present invention, which is applied for gear shift control of a DCT vehicle, and FIG. 4 is a graph illustrating a gear shift control method of a DCT vehicle according to the present invention.

Referring to FIGS. 3 and 4, the gear shift control method of a DCT vehicle according to an embodiment of the present invention may be largely divided into five steps.

Preferably, the gear shift control method includes a gear shift start determination step (step S100) of determining whether a kick down shift is started, a biaxial shift determination step (step S200) of determining whether the kick down shift is a biaxial shift, a clutch torque control step (step S300) of performing a clutch torque control corresponding to the biaxial shift, a clutch synchronization determination step (step S400) of determining whether the speed of the target gear input shaft is synchronized with the speed of the engine, and a gear shift performing step (step S500) of engaging a target gear.

At step S100, whether a kick down shift is started is determined from whether a vehicle state according to handling of a driver satisfies an acceleration condition. Whether a kick down shift is started may be determined from part or all of information on the displacement of the acceleration pedal according to handling of the driver and the difference between the current revolutions per minute of the engine and the target revolutions per minute (synchronized speed of the target gear) set according to handling of the acceleration pedal.

For example, if increase of the displacement of the acceleration pedal exceeds a reference value within a set reference time, it may be regarded as a kick down shift, i.e., handling of the acceleration pedal for rapid acceleration. In addition, if increase of target revolutions per minute set according to handling of the acceleration pedal with respect to the current revolutions per minute of the engine exceeds a reference value, it may be also regarded as a kick down shift. Of course, the present invention is not limited to the exemplified condition.

If it is determined that a kick down shift is started as a result of the determination through step S100, it is determined whether the kick down shift is a biaxial shift among the kick down shift, in which the difference of gear level is as much as an odd-numbered gear level larger than one level (step S200). If the difference C between the revolutions per minute of the target gear input shaft INPUT#1 and the target revolutions per minute (synchronized speed of the target gear) at the time point of starting the kick down shift is larger than a preset reference value (Th1 rpm), this may be determined as a biaxial shift (see FIG. 4).

In the case of a kick down shift in which the difference is as much as an even-numbered gear level larger than two levels, the current gear and the target gear have the same input shaft. Therefore, revolutions per minute of the target gear input shaft INPUT#1 is equal to the current revolutions per minute of the engine at the time point of starting the gear shift, i.e., at the time point of requesting the gear shift, and the difference between the revolutions per minute of the target gear input shaft INPUT#1 and the target revolutions per minute is smaller than the reference value (Th1 rpm). Accordingly, in this case, it is determined as a coaxial shift, and a gear shift process of another form is applied.

If it is determined that the current shift state of the vehicle is a biaxial shift as a result of the determination through step S200, clutch torque control is performed to increase revolutions per minute of the target gear input shaft INPUT#1 together with revolutions per minute of the engine increasing according to an acceleration request (step S300). Preferably, clutch torque is controlled to increase the revolutions per minute of the target gear input shaft INPUT#1 together with the revolutions per minute of the engine increasing toward the target revolutions per minute set by handling the acceleration pedal.

The clutch torque control includes a release torque control for the release-side clutch CL2 between the current gear input shaft INPUT#2 and the engine and an apply torque control for the connection-side clutch CL1 between the target gear input shaft INPUT#1 and the engine. The release torque control is a release-side clutch CL2 control for disconnecting power connection between the current gear input shaft INPUT#2 and the engine, and the apply torque control refers to a connection-side clutch CL1 control for connecting the target gear input shaft INPUT#1 to the engine.

At step S300, specifically, the state of power connection to the current gear input shaft INPUT#2 is released by uniformly decreasing the torque of the release-side clutch CL2, and at the same time, the torque of the connection-side clutch CL1 is uniformly increased from the time point of inputting a gear shift request to the synchronization determination time point f1, so that revolutions per minute of the target gear input shaft INPUT#1 and revolutions per minute of the engine are increased together to be synchronized with each other.

In synchronizing revolutions per minute of the target gear input shaft INPUT#1 with revolutions per minute of the engine through the control of the torque of the connection-side clutch CL1, the torque of the connection-side clutch CL1 is jumped to the synchronization start torque (a NM) at the time point of starting the kick down shift, i.e., at the time point of requesting the gear shift, and the clutch torque is controlled to increase revolutions per minute of the target gear input shaft INPUT#1 until the synchronization determination time point f1, at which revolutions per minute of the target gear input shaft INPUT#1 is almost equal to revolutions per minute of the engine, at a certain torque gradient (b NM/sec).

A value of the synchronization start torque (a NM) and a value of the torque gradient (b NM/sec) are variables varying according to the difference C between the revolutions per minute of the target gear input shaft INPUT#1 and the target revolutions per minute at the time point of starting a kick down shift and may be recorded in advance in a recording device in the form of a table through repeated experiments or prior simulations, and the variables may be automatically selected if a value of the difference C between the revolutions per minute of the target gear input shaft INPUT#1 and the target revolutions per minute is determined.

Of course, it may be possible to consider all the methods that can be practically derived, including a method of deriving a certain relational expression of the difference C between the revolutions per minute of the target gear input shaft INPUT#1 and the target revolutions per minute by utilizing data acquired through the repeated experiments or the prior simulations and automatically calculating and outputting a value of the synchronization start torque (a NM) and a value of the torque gradient (b NM/sec) by utilizing the derived relational expression if a value of the difference C is inputted.

At step S400, it is determined whether revolutions per minute of the target gear input shaft INPUT#1 and revolutions per minute of the engine increased through the control of the torque of the apply clutch are synchronized with each other. At this point, the synchronization may be determined from the information on the revolution provided by a detection sensor for detecting revolving speed of the target gear input shaft INPUT#1 and a crank sensor for detecting revolutions per minute of the engine.

At step S400, first, it is determined, from the information provided by the sensors, whether the synchronization determination time point f1 is arrived (step S410), in which revolutions per minute of the target gear input shaft INPUT#1 is almost equal to or similar to revolutions per minute of the engine. Then, it is determined whether a synchronization completion time point is arrived (step S420), in which the revolutions per minute of the target gear input shaft and the revolutions per minute of the engine synchronized with each other become equal to the target revolutions per minute of the engine (synchronized speed of the target gear).

If it is determined, through the comparison between the revolutions per minute of the target gear input shaft INPUT#1 and the revolutions per minute of the engine, that the synchronization determination time point f1 is arrived, in which revolutions per minute of the target gear input shaft INPUT#1 is almost equal to or similar to revolutions per minute of the engine, the torque at the time point of arriving at the synchronization determination time point f1 is maintained as the torque of the connection-side clutch CL1 for a certain time period, preferably from the synchronization determination time point f1 to the synchronization completion time point at which engagement of the target gear starts.

Then, if the synchronization completion time point is arrived, in which the revolutions per minute of the target gear input shaft INPUT#1 and the revolutions per minute of the engine become equal to the target revolutions per minute of the engine (synchronized speed of the target gear), since the torque of the connection-side clutch is reduced to a clutch torque transfer start point TP and engagement of the target gear is accomplished in the state, smooth gear shift without a shift shock is implemented.

Meanwhile, at the gear shift performing step (step S500) of engaging the target gear, if the synchronization determination time point f1 is arrived through the control of the apply clutch for the connection-side clutch CL1, in which revolutions per minute of the target gear input shaft INPUT#1 becomes equal to or similar to revolutions per minute of the engine, it is controlled to move a shifter of the target gear so that shifter may stand by in the vicinity of the synchronizing start time point.

Then, if engagement of the target gear is accomplished together with a gear engagement start command at the time point where revolutions per minute of the target gear input shaft INPUT#1 and revolutions per minute of the engine are increased to the target revolutions per minute (synchronized speed of the target gear) set by the acceleration pedal (a time point of completing synchronization between revolutions per minute of the target gear input shaft and revolutions per minute of the engine), engagement of the target gear is accomplished without a separate synchronizing process, and thus the shift time may be reduced as much.

Engagement of the target gear may be implemented through adjustment of supply voltage of a hydraulic control solenoid valve involved in the engagement of the target gear among a plurality of hydraulic control solenoid valves. That is, engagement of the target gear may be implemented by adjusting voltage to switch the fluid passage of the hydraulic control solenoid valve so that fluid pressure may be provided to a clutch or a brake which enables and disables engagement of the target gear, among a plurality of clutches or brakes.

Figure 5:
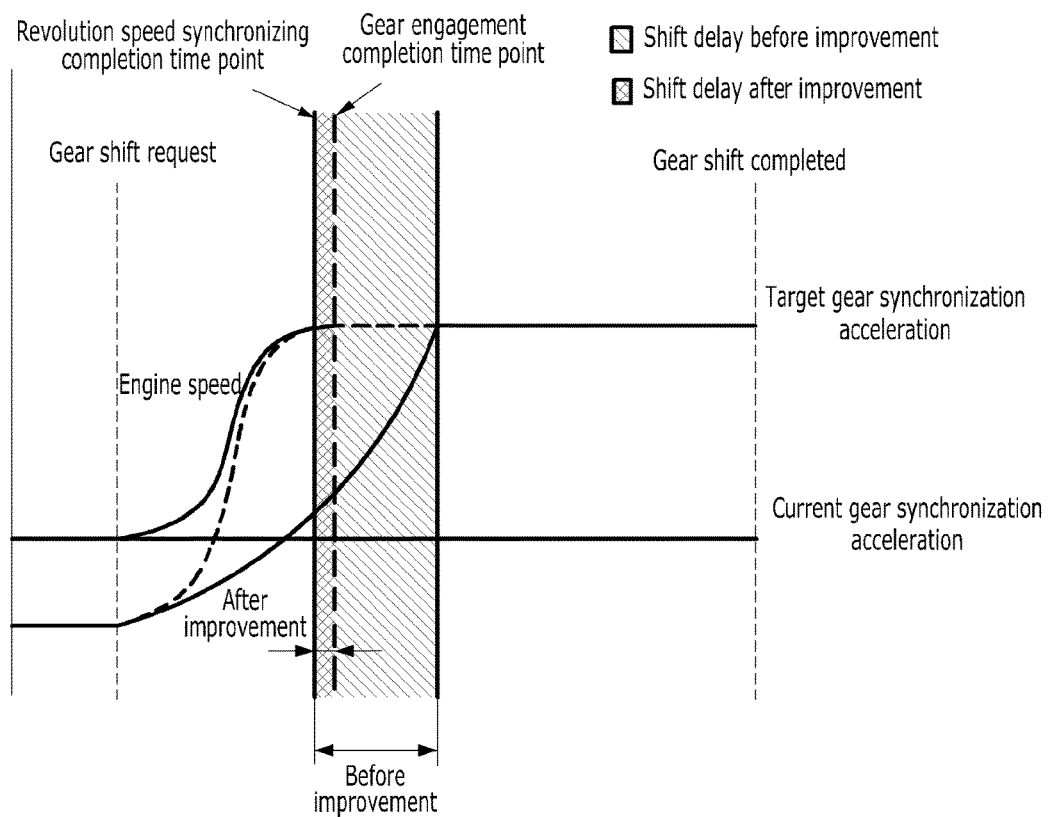
FIG. 5 is a view comparing the state of shift delay before and after improving the DCT gear shift control.

FIG. 5 is a view comparing the state of shift delay before and after improving the DCT gear shift control.

Referring to FIG. 5, in the conventional technique, in the case of a kick down shift in which the difference between the synchronized speed of the target level and the actual revolving speed of the target gear input shaft is big, the speed of boosting the engine is faster although the gear is engaged as soon as possible, and thus unnecessary 'release clutch engine control' or 'engine torque reduction control' is required. Accordingly, the time from the time point of arriving at the target revolutions per minute (a time point of completing synchronization between revolutions per minute of the target gear input shaft and revolutions per minute of the engine) to the time point of completing engagement of the gear (shift delay time) is long.

Contrarily, in the present invention, since clutch torque is controlled to simultaneously increase revolutions per minute of the target gear input shaft and revolutions per minute of the engine and engagement of the target gear is attempted at the time point of synchronizing the revolutions per minute of the target gear input shaft with the revolutions per minute of the engine when a kick down shift is made, the time from the time point of arriving at the target revolutions per minute (a time point of completing synchronization between revolutions per minute of the target gear input shaft and revolutions per minute of the engine) to the time point of completing engagement of the gear (shift delay time) is considerably reduced compared with the time taken before the improvement.

That is, since the torque of the connection-side clutch is controlled to simultaneously increase the revolving speed of the input shaft combined with a target gear and the engine speed before the target gear is engaged, the problem of shift delay, which occurs when a kick down shift having a big difference between the speed of the target gear input shaft and the speed of the engine, is made can be improved greatly, and a feeling of torque discontinuity caused by the shift delay and abrasion of the clutch can be minimized.

According to the gear shift control method of a DCT vehicle according to the present invention, since clutch torque is controlled to simultaneously increase revolutions per minute of the target gear input shaft and revolutions per minute of the engine and engagement of the target gear is attempted at the time point of synchronizing the revolutions per minute of the target gear input shaft with the revolutions per minute of the engine when a kick down shift is made, the engine speed can be rapidly increased in accordance to acceleration intention of a driver, and accordingly, prompt gear shift without a feeling of torque discontinuity can be implemented.

That is, since the torque of the connection-side clutch is controlled to simultaneously increase the revolving speed of the input shaft combined with a target gear and the engine speed before the target gear is engaged, the problem of shift delay, which occurs when a kick down shift having a big difference between the speed of the target gear input shaft and the speed of the engine, is made can be improved greatly, and a feeling of torque discontinuity caused by the shift delay and abrasion of the clutch can be minimized.

In the detailed description of the present as described above, only special embodiments according thereto have been described. However, it should be understood that the present invention is not limited to the special form mentioned in the detailed description and rather includes all modifications, equivalents and substitutions existing within the spirit and scope of the present invention defined by the appended claims.

What is claimed is:

1. A gear shift control method of a vehicle mounted with a Dual Clutch Transmission (DCT) including a first input shaft and a second input shaft provided in a first clutch and a second clutch to intermittently receive engine power and a first output shaft and a second output shaft respectively corresponding to the first input shaft and the second input shaft which alternately form gears according to a series of gear ratios, together with a separate shift mechanism, wherein when a difference of gear level between a target gear and a current gear is as much as an odd-numbered gear level larger than one level when a kick down shift of performing a gear shift to a lower gear is made as an acceleration pedal is handled according to an acceleration intention of a driver, torque of a release-side clutch for transferring the engine power to the current gear is uniformly decreased, and torque of a connection-side clutch is uniformly increased to synchronize revolutions per minute of a target gear input shaft with increasing revolutions per minute of an engine, and a gear shift control for engaging the target gear is performed at a time point of synchronizing the revolutions per minute of the target gear input shaft with the revolutions per minute of the engine.

2. A gear shift control method of a Dual Clutch Transmission (DCT) vehicle, the method comprising:

a gear shift start determination step of determining whether a kick down shift, which performs a gear shift to a lower gear as an acceleration pedal is handled according to an acceleration intention of a driver, is started;

a biaxial shift determination step of determining, when the kick down shift is started, whether the gear shift is a biaxial shift, in which a difference of gear level between a target gear and a current gear is as much as an odd-numbered gear level larger than one level;

a clutch torque control step of uniformly decreasing torque of a release-side clutch and uniformly increasing torque of a connection-side clutch to synchronize revolutions per minute of a target gear input shaft with increasing revolutions per minute of an engine, when a current gear state of the vehicle determined at the biaxial shift determination step is the biaxial shift;

a clutch synchronization determination step of determining whether the revolutions per minute of the target gear input shaft is synchronized with the revolutions per minute of the engine by the clutch torque control; and a gear shift performing step of performing gear shift control for engaging the target gear, when the revolutions per minute of the target gear input shaft is synchronized with the revolutions per minute of the engine.

3. The method according to claim 2, wherein at the gear shift start determination step, whether the kick down shift is started is determined from part or all of information on a displacement of the acceleration pedal and a difference between the current revolutions per minute of the engine and target revolutions per minute set according to handling of the acceleration pedal.

4. The method according to claim 2, wherein at the biaxial shift determination step, when it is a down shift in which a difference between the revolutions per minute of the target gear input shaft and the target revolutions per minute of the engine at a time point of starting the kick down shift is larger than a preset reference value, the down shift is determined as the biaxial shift in which the difference is as much as the odd-numbered gear level larger than one level.

5. The method according to claim 2, wherein in a process of synchronizing the revolutions per minute of the target gear input shaft with the revolutions per minute of the engine through the clutch torque control, the torque of the connection-side clutch is jumped to a synchronization start torque at a time point of starting the kick down shift and increased until a synchronization determination time point at a certain torque gradient.

6. The method according to claim 5, wherein a value of the synchronization start torque and a value of the torque gradient are values selected from values recorded in advance in correspondence to a difference between the revolutions per minute of the target gear input shaft and the target revolutions per minute of the engine at the time point of starting the kick down shift.

7. The method according to claim 2, wherein the clutch synchronization determination step includes the steps of:
    determining whether the revolutions per minute of the target gear input shaft and the revolutions per minute of the engine arrive at a synchronization determination time point; and
    determining whether the revolutions per minute of the target gear input shaft and the revolutions per minute of the engine synchronized with each other arrive at a synchronization completion time point at which the revolutions per minute of the target gear input shaft and the revolutions per minute of the engine become equal to a target revolutions per minute of the engine.

8. The method according to claim 7, wherein when it is determined that the revolutions per minute of the target gear input shaft and the revolutions per minute of the engine arrive at the synchronization determination time point, the torque at the time point of arriving at the synchronization determination time point is maintained as the torque of the connection-side clutch until the synchronization completion time point.

9. The method according to claim 7, wherein when it is determined that the revolutions per minute of the target gear input shaft and the revolutions per minute of the engine arrive at the synchronization completion time point, engagement of the target gear is performed after the torque of the connection-side clutch is reduced to a clutch torque transfer start point.

10. The method according to claim 2, wherein at the gear shift performing step, engagement of the target gear is implemented by adjusting supply voltage of a hydraulic control solenoid valve involved in the engagement of the target gear among a plurality of hydraulic control solenoid valves.

11. The method according to claim 10, wherein the hydraulic control solenoid valve switches a fluid passage so that fluid pressure is provided to a clutch or a brake which enables and disables engagement of the target gear, among a plurality of clutches or brakes.

* * * * *